(12) United States Patent
Wan et al.

(10) Patent No.: US 8,611,286 B2
(45) Date of Patent: Dec. 17, 2013

(54) METHODS FOR CHANNEL-DEPENDENT TIME-AND-FREQUENCY-DOMAIN SCHEDULING AND RELATED COMMUNICATION NODES

(75) Inventors: Lei Wan, Beijing (CN); Yin Liu, Beijing (CN); Jingyi Liao, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 965 days.

(21) Appl. No.: 12/377,010

(22) PCT Filed: Aug. 17, 2006

(86) PCT No.: PCT/SE2006/050285
§ 371 (c)(1),
(2), (4) Date: Feb. 10, 2009

(87) PCT Pub. No.: WO2008/020790
PCT Pub. Date: Feb. 21, 2008

(65) Prior Publication Data
US 2010/0165932 A1    Jul. 1, 2010

(51) Int. Cl.
*H04B 7/212* (2006.01)
(52) U.S. Cl.
USPC .......................................... 370/329; 370/340
(58) Field of Classification Search
None
See application file for complete search history.

(56) References Cited

U.S. PATENT DOCUMENTS

| 2006/0256805 | A1 | 11/2006 | Cho et al. |
| 2007/0258373 | A1* | 11/2007 | Frederiksen et al. ......... 370/235 |
| 2007/0280175 | A1* | 12/2007 | Cheng et al. .................. 370/338 |
| 2007/0297386 | A1 | 12/2007 | Zhang et al. |

OTHER PUBLICATIONS

David Gesbert et al. How Much Feedback is Multi-User Diversity Real worth? Eurecom Institute, Sophia-Antipolis, France, 2004 IEEE.*
Christian Wengerter et al. Fairness and Throughput Analysis for Generalized Proportional Fair Frequency Scheduling in OFDMA, 2005 IEEE.*
Knopp et al., "Information Capacity and Power Control in Single-Cell Multiuser Communications", in Proceedings of International Conference on Communication, Jun. 1995, vol. 1, pp. 331-335.
Anchun et al., "Dynamic Resource Management in the Fourth Generation Wireless Systems", Proceedings IEEE International Conference on Communication Technology, Apr. 2003, pp. 1095-1098.
Kazmi et al., "Scheduling Algorithms for HS-DSCH in a WCDMA Mixed Traffic Scenario", IEEE PIMRC'2003 Beijing, China 2003, 5 pages.
A International Search Report for International Application No. PCT/SE2006/050285 dated Jun. 7, 2007 (4 pages).
A International Preliminary Report on Patentability for International Application No. PCT/SE2006/050285 dated Sep. 8, 2008 (8 pages).

(Continued)

*Primary Examiner* — David Oveissi
(74) *Attorney, Agent, or Firm* — Myers Bigel Sibley & Sajovec, P.A.

(57) ABSTRACT

In a method of improved channel-dependent time- and frequency-domain scheduling in an OFDM based telecommunication system with multiple user terminals, determining S0 a parameter value representative of the system load; pre-selecting S1 a subset of user terminals if the determined parameter value is larger than or equal to a predetermined threshold; and performing S2 frequency-domain scheduling of the pre-selected subset, to reduce the downlink signaling overhead and enabling improved efficiency of the channel-dependent time- and frequency-domain scheduling.

22 Claims, 4 Drawing Sheets

(56) References Cited

OTHER PUBLICATIONS

Gesbert D. et al., *"How Much Feedback is Multi-User Diversity Really Worth?"*, Communications, 2004 IEEE International Conference, vol. 1 on Jun. 20-24, 2004, pp. 234-238.

Hassel V. et al., *"Exploiting Multiuser Diversity Using Multiple Feedback Thresholds"*, Vehicular Technology Conference, 2005. VTC 2005—Spring. 2005 IEEE 61st, vol. 2, May 30-Jun. 1, 2005, (pp. 1302-1306).

Zhao Qing, et al., *"A Dynamic Queue MAC Protocol for Random Access Channels with Multipacket Reception"*, Systems and Computers, 2000. Conference Record of the Thirty-Fourth Asilomar Conference, vol. 2, 2000, (pp. 1235-1239).

Bonneau, Nicholas, et al., *"Performance of Channel Inversion Schemes for Multi-User OFDMA"*, Wireless Communication Systems, 2005. $2^{nd}$ International Symposium on, Sep. 5-7, 2005, (pp. 308-312).

Wengerter, C. et al., *"Fairness and Throughput Analysis for Generalized Proportional Fair Frequency Scheduling in OFDMA"*, Vehicular Technology Conference, 2005. VTC 2005—Spring. 2005 IEEE 61st, vol. 3, May-Jun. 1, 2005, (pp. 1903-1907).

\* cited by examiner

METHODS FOR CHANNEL-DEPENDENT TIME-AND-FREQUENCY-DOMAIN SCHEDULING AND RELATED COMMUNICATION NODES

TECHNICAL FIELD

The present invention relates to telecommunication systems in general, and specifically to methods and arrangements for improved channel-dependent time-and-frequency-domain scheduling in an Orthogonal Frequency Division Multiplex (OFDM) based telecommunication system.

BACKGROUND

In the area of user resource allocation for wireless fading channels, great effort is presently focused on scheduling [1-2]. Scheduling algorithms can typically be classified into channel-dependent or channel-independent scheduling according to the dependence on the channel. An example of such an algorithm is Round Robin (RR), a typical channel-independent scheduling, which benefits from simplicity at the price of poor performance. The class of channel-dependent scheduling algorithms utilize the so-called channel state information (CSI) or channel quality indicator (CQI) in order to improve the system performance.

For OFDM systems, the above mentioned channel-dependent scheduling can be further classified into so called time-domain scheduling, where a single user or user terminal per frame is scheduled in a given time scale, and so called time-and-frequency-domain scheduling, where multiple users per frame are scheduled exclusively in a given time scale. The time-and-frequency-domain scheduling, hereinafter referred to as frequency-domain scheduling, has previously been shown to provide better performance than the time-domain scheduling due to the multi-user diversity in the frequency domain, especially for wideband transmissions [1]. However, the frequency-domain scheduling requires CSI or CQI feedback once per frequency-domain resource unit, which requires extensive overhead signaling that is much higher than that for time-domain scheduling, i.e. one feedback for the whole band at a time. In addition, there are many different detailed criteria for the frequency-domain scheduling, such as Max-CIR, Proportional-Fair (PF), weighted-queue-PF etc [3], for both frequency-domain and time-domain scheduling.

For the class of channel-dependent scheduling algorithms the time-domain scheduling has the advantages of low computational complexity and low signaling overhead (for it self and power allocation, link adaptation afterwards as well). However, due to the frequency-selectivity along the wideband, the time-domain scheduling cannot guarantee that the scheduled user performs well on the whole band, therefore, can hardly achieve good performances in capacity and coverage.

Frequency-domain scheduling schemes perform the criteria in the more refined sub-group (e.g. chunk) of the whole band, and utilize the multi-user diversity as well, so that the performances in capacity and coverage are greatly improved as compared to the time-domain scheduling schemes.

However, the disadvantages of the otherwise advantageous frequency-domain scheduling increase as the performance improves. Specifically, the computational complexity increases greatly with the number of chunks and the system load. In addition, since the scheduled user terminals may be different from one chunk to another, a large quantity of DL signaling is required for the frequency-domain adaptation (FDA), including the chunk allocation and the subsequent power allocation and link adaptation per user. The signaling overhead thus increases linearly with the increasing bandwidth, i.e. with the number of chunks, and with the system load, i.e. the number of users.

These disadvantages have prevented, up until now, the further exploitation of channel-dependent time-and-frequency domain scheduling.

Consequently, there is a need for methods and arrangements enabling exploiting the advantages of channel-dependent time- and frequency domain scheduling whilst at the same time reducing the known disadvantages.

SUMMARY

A general problem with known channel-dependent scheduling algorithms is how to utilize the advantageous performance of frequency domain scheduling but without the above described disadvantages.

A general object of the present invention is to provide methods and arrangements for improved channel-dependent frequency-domain scheduling.

These and other objects are achieved according to the attached set of claims.

According to a basic aspect, the present invention comprises determining the load of the system. If the load equals or surpasses a predetermined threshold value, a subset of all the user terminals are pre-selected for scheduling and subsequently scheduled.

Advantages of the present invention comprise:
Reduced overhead downlink signaling for channel-dependent frequency-domain scheduling.
Reduced overhead signaling for resource allocation.
Reduced overhead signaling for link adaptation
The complexity of the corresponding frequency-domain adaptation can be limited within a pre-defined scale.
The scales of signaling overhead and computational complexity can be pre-defined as fixed, regardless of varying system load, for the given bandwidth, which is favoured by the further signaling design.

BRIEF DESCRIPTION OF THE DRAWINGS

The invention, together with further objects and advantages thereof, may best be understood by referring to the following description taken together with the accompanying drawings, in which.

ABBREVIATIONS

Figure 1:
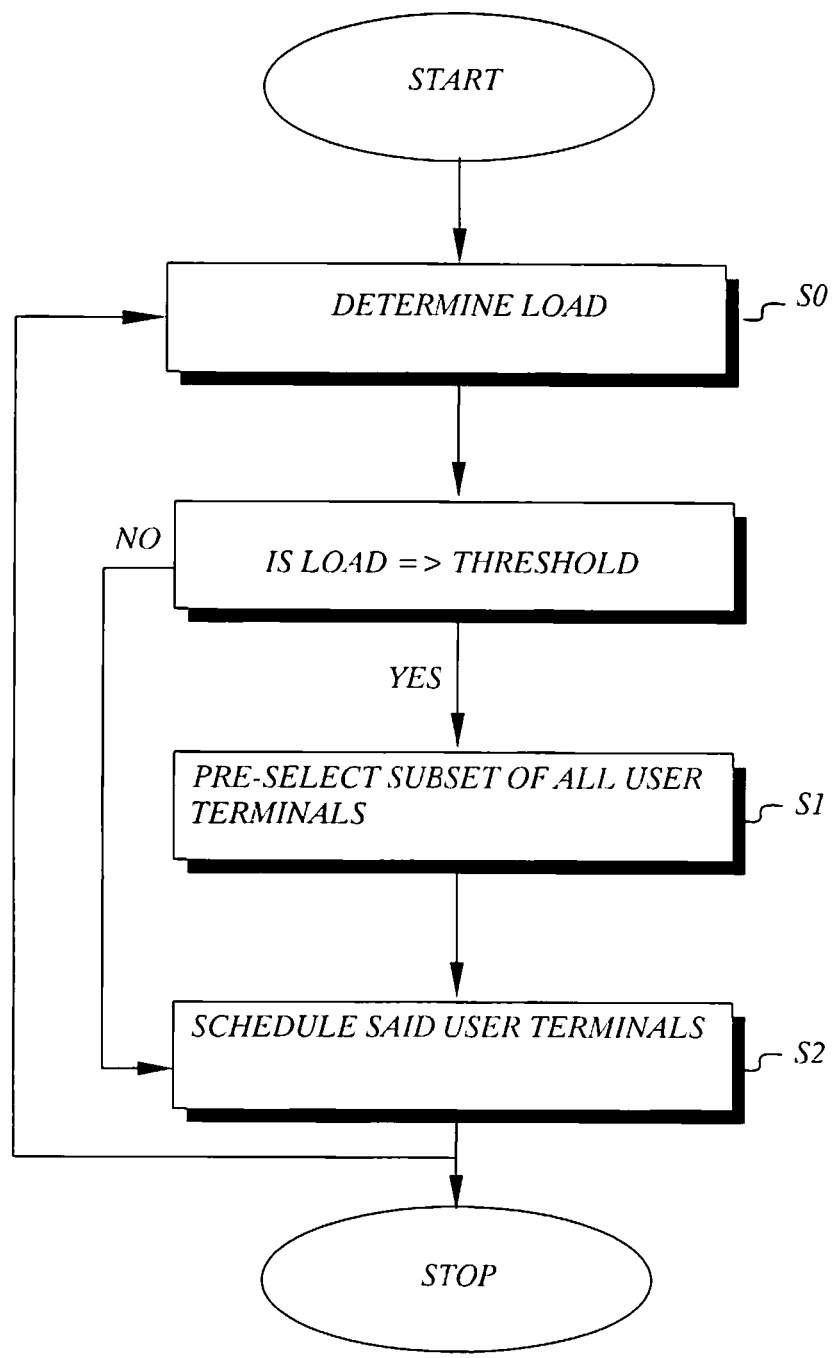
FIG. 1 is a schematic flow diagram of an embodiment of a method according to the invention.

BPSK Binary Phase Shift Keying
CIR Carrier to Interference Ratio
CQI Channel Quality Indicator
CSI Channel State Information
DL Down Link
FDA Frequency Domain Adaptation
HSDPA High-Speed Downlink Packet Access
LA Link Adaptation MCS Modulation and Coding Scheme
OFDM Orthogonal Frequency Division Multiplex
PA Power Allocation
PF Proportional Fair
PFT Proportional Fair in the Time domain
PFTF Proportional Fair in the Time and Frequency domain
QAM Quadrature Amplitude Modulation
QPSK Quadrature Phase Shift Keying
RR Round Robin
SINR Signal to Interference Noise Ratio

DETAILED DESCRIPTION

To provide a further insight into the disadvantages of channel-dependent frequency-domain scheduling as compared to channel-dependent time-domain scheduling a further detailed discussion and analysis is provided below.

The frequency-domain adaptation (FDA) related signaling overhead in the downlink (DL) consists of the signaling used to inform FDA decisions for each user or user terminal, where the pilot signals for signal to interference noise ratio (SINR) estimation are assumed to be the same for all the schemes, therefore not taken into account in the following.

As an illustrative example, consider a system with $N_{ch}$ chunks in the DL to serve N users per cell, where the number $N_{bitsDCCH}$ of signaling bits per frame is calculated according to the following:

Time-Domain Scheduling: (Round Robin (RR) or Proportional-Fair (PF) in Time Domain)
  For user index with uniform power allocation (PA): 1×⌈log$_2$ N⌉bits/frame, where ⌈x⌉ is the minimum integer that is equal to or larger than x.
  For user index with On/Off PA: 1×⌈log$_2$ N⌉+1×$N_{ch}$ bits/frame
  For link adaptation (LA): $k_{mod}$+$k_{cr}$ bits/frame, e.g. for 20 MHz bandwidth
    Modulation mode index among {BPSK, QPSK, 16QAM, 64QAM}: $k_{mod}$=2 bits/frame
    Index for coding rate, corresponding to information block size: $k_{cr}$=f($N_{symsperframe}$, ModOrder) (e.g. at most 19 bits/frame for 20 MHzm while for HSDPA it is about 6 bits/frame)

For the example for RR time-domain scheduling, uniform power allocation and single modulation and code scheme (MCS) with continuous coding rate, the considered number of DL signaling bits $N_{bitsDCCH}$ becomes:

$$N_{bitsDCCH} = \lceil \log_2(N) \rceil + (k_{mod}+k_{cr})[\text{bits/frame}], \quad (1)$$

Frequency-Domain Scheduling
  For user index per chunk with uniform PA: $N_{ch}$×⌈log$_2$ N⌉ bits/frame;
  For user index per chunk with On/Off PA: $N_{ch}$×⌈log$_2$ N⌉+$N_{ch}$×1 [bits/frame]
  For LA: f(N)=$k_{mod}$·N+$k_{cr}$·N bits/frame, depending on how many users are to be scheduled
  For the example of Proportional Fair in Time and Frequency domain (PFTF), uniform PA and single MCS with continuous coding rate, the total DL FDA signaling $N_{bitsDCCH}$ is determined according to:

$$N_{bitsDCCH} = N_{ch}\lceil \log_2(N) \rceil + N \times (k_{mod}+k_{cr})[\text{bits/frame}] \quad (2)$$

which is substantially larger than that of time-domain scheduling. As can be seen in Equation (2) the scheduling algorithm is the largest contributor to the DL overhead signaling.

Accordingly, as recognized by the inventors, if the DL signaling of FDA can be reduced, the efficiency and usefulness of channel-dependent frequency-domain scheduling can be further improved.

A basic embodiment according to the invention thus provides a method of pre-selecting a subset of the active user terminals in a system and performing frequency-domain scheduling, link adaptation and resource allocation for that subset. The remaining set of user terminals are processed subsequently, thereby significantly reducing the DL overhead signaling in each time instance.

A specific embodiment of a method according to the invention will be described below with reference to the schematic flow diagram of FIG. 1. Initially, a present load of the system is determined S0 and compared to a preset threshold. The load can be determined by measuring some measure or parameter value that is dependent on the total load, i.e., relative signaling overhead for all active users. Consequently, according to a specific embodiment, the above mentioned present threshold is a specific value of the signaling overhead, i.e., 10%.

If the determined load of the system is larger than or equal to the predetermined threshold, pre-selection is deemed necessary, and a subset of user terminals are pre-selected S1 for scheduling. The subset of user terminals comprises at least two user terminals and less than all terminals.

Finally, the subset of user terminals is subjected to scheduling S2 and optionally link adaptation and resource allocation according to known measures.

If the threshold is not surpassed, then all user terminals are scheduled in a known manner.

According to a specific embodiment, the pre-selection process can optionally be repeated for a plurality of subsets until the measured load of the system is below the preset threshold or based on some other criteria.

There are several potential criteria for pre-selecting the above mentioned subset of user terminals:
  Random selection: pre-select the user terminals randomly;
  Max-CIR selection: according to a Max-CIR criterion $$J = \arg\max_{1 \leq n \leq N} \gamma^{(n)}, \quad (3)$$

where $\gamma^{(n)}$ denotes the estimated SINR of user n, the user(s) with the highest SINR(s) according to Equation (3) are selected frame-wise or chunk-wise.

PF-based selection: according to the PF criterion $$J = \arg\max_{1 \leq n \leq N} \frac{TP_{est}^{(n)}}{TP_{av}^{(n)}}. \quad (4)$$

where $TP_{est}^{(n)}$ denotes the estimated throughput of user terminal with index n and $TP_{av}^{(n)}$ stands for the average throughput of user terminal n each frame, the user(s) with the highest ratio(s) of (4) are selected frame-wise.

There may also be other pre-selection criteria based on chunk-wise PF or including other cost functions or quality of service (QoS) for each user terminal.

By utilizing the step of pre-selection, the users are limited to a pre-defined scale in order to reduce the corresponding DL signaling.

Among the pre-selected users, the frequency-domain scheduling, power allocation and link adaptation can be further performed. The non-elected or discarded user terminals can optionally be queued until the next round of signal processing. In this manner the number of bits for the DL FDA signaling of Equation (2) for the simplified PFTF schemes becomes $$N_{bitsDCCH}=N_{sel}\times \lceil \log_2(N) \rceil + N_{ch} \times \lceil \log_2(N_{sel}) \rceil + N_{sel} \times (k_{mod}+k_{cr})[\text{bits/frame}] \qquad [5]$$

where the first term of Equation (5) corresponds to the user index of the pre-selected user terminals.

To illustrate the benefits of the method according to the invention further, a few simulation experiments are presented and described below.

The basic simulation parameters are summarized below in Table 1.

TABLE 1

Basic simulation parameters

| Cell Plan | Number of sites | 7 |
| --- | --- | --- |
| | Sectors/site | 1 |
| | Frequency reuse | 1 |
| | Cell radius [meter] | {500, 1000, 2000, 3000} |
| System Assumption | Duplex mode | FDD |
| | Channel model | 3GPP SCME, Suburban macro |
| | Bandwidth [MHz] | 20 |
| | Available subcarriers/tones | 1280 |
| | Chunk size [tones per chunk] | 16 |
| | Traffic model | Full-buffer traffic model |
| | Transmitter/receiver antennas | SISO, omni |
| | Transmission power [watt.] | 80, uniform power allocation |
| | Average offered calls per cell | 8, 30 |
| Transmission schemes | Modulation and coding scheme (MCS) | Single MCS per frame |
| | Modulation | BPSK, QPSK, 16QAM, 64QAM |
| | Link adaptation (LA) | BLER_target = 0.1 |
| | Coding rate | Continuous |

Remarks: (*) the same MCS for all chunks allocated to one user in an OFDM frame

For the simulations the Priority-Fair (PF) criteria in the time-domain (PFT) scheduling represents the channel-dependent time-domain scheduling. The PF in time and frequency domain (PFTF) represents the channel-dependent frequency-domain scheduling. For pre-selection schemes, random selection and PFT selection are considered. Therefore, in the following description four schemes are compared for illustrations, namely:

Pure time domain scheduling (PFT),

Frequency-domain scheduling (PFTF) with Random pre-selection (Rand+PFTF),

Priority-Fair (PFT) pre-selection in time domain+PFTF (PFT+PFTF) and

Frequency-domain scheduling (PFTF) without pre-selection

Two cases of different system load e.g. 8 and 30 user terminals are considered. However, the invention is not limited to those load scenarios. Moreover, for the load of 30 user terminals the impact of the pre-selection bound (4 and 8) is also shown. The DL signaling of the above schemes under different cases are listed below in Table 2.

TABLE 2

DL signaling of the four schemes

| | User pre-selection + PFTF | | PFTF | |
| --- | --- | --- | --- | --- |
| Cell load [users/cell] | Overhead [bits/frame] | Relative overhead | Overhead [bits/frame] | Relative overhead |
| 8 | 256 (bound 4) | 5% | 408 | 8% |
| 30 | 264 (bound 4) | 5.1% | 1030 | 20% |
| | 448 (bound 8) | 8.7% | | |

It can be seen that with any type of user pre-selection, the resulting DL signaling is fixed and much less than the pure frequency-domain scheduling PFTF. Especially in the case of high load, e.g., 30, the DL signaling with user pre-selection is even smaller than the pure PFTF scheme. The reduction ratios (to the signaling of the pure PFTF) are 74% (bound of 4) and 57% (bound of 8), respectively, which are very remarkable.

It also implies that the resulting computational complexity is greatly reduced by the application of user pre-selection according to the invention.

Figure 3:
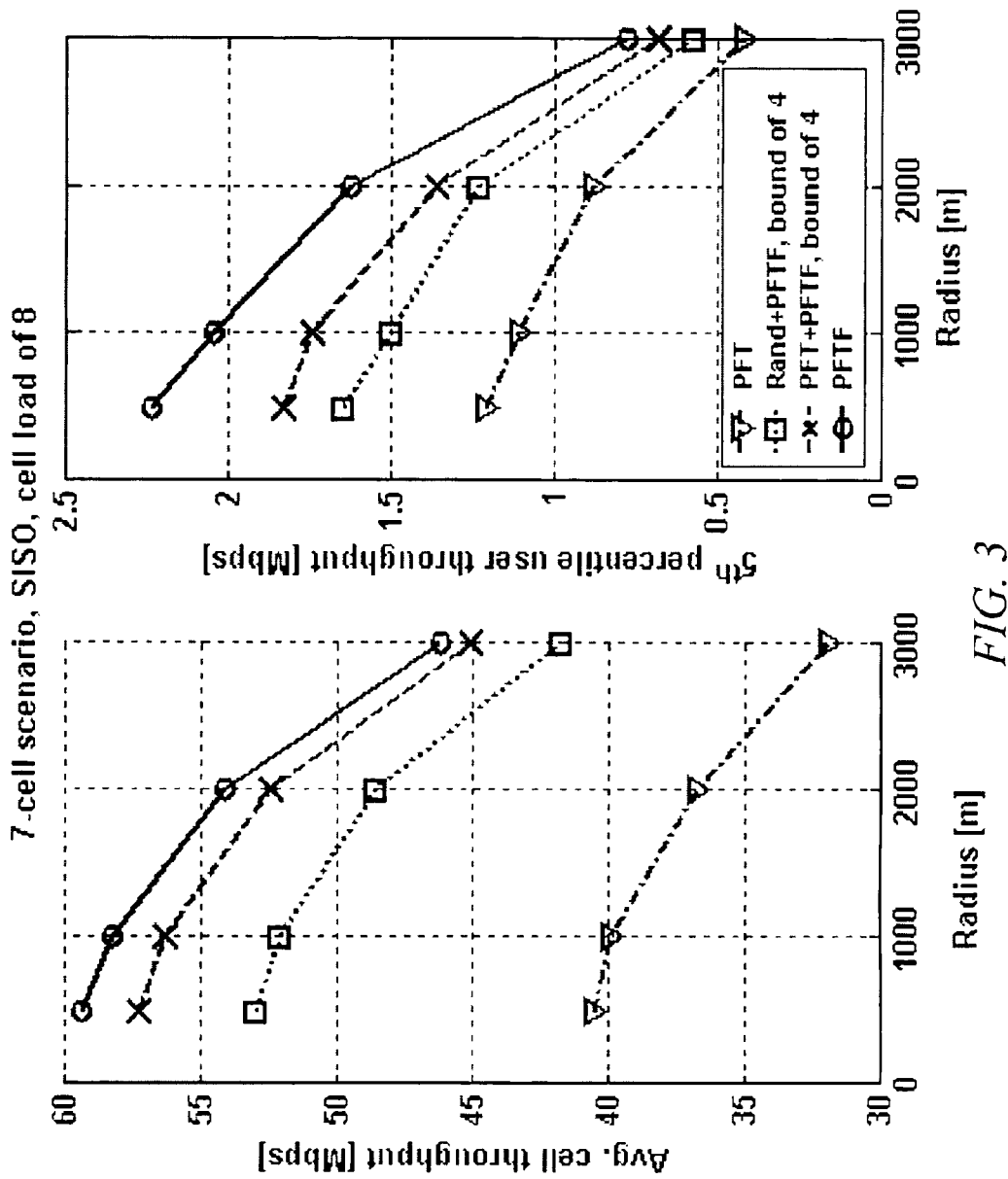
FIG. 3 shows the impact for a first cell load of the implementation of an embodiment of the method and arrangement according to the invention.
Figure 4:
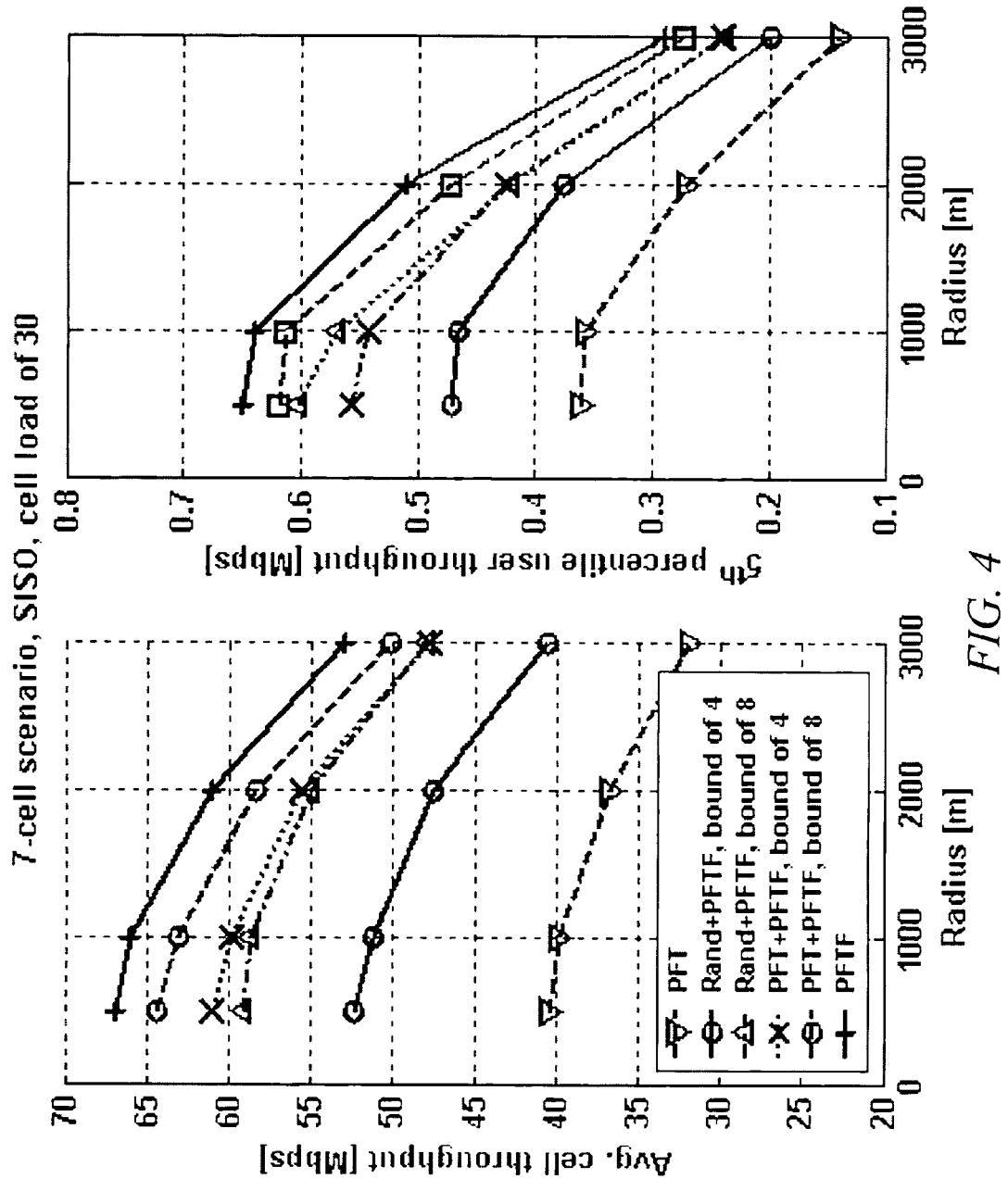
FIG. 4 shows the impact for a second cell load of the implementation of an embodiment of the method and arrangement according to the invention.

On the other hand, the slight performance loss as the price of signaling rejection deserves observation. FIGS. 3 and 4 depict the performances of the aforementioned schemes in the average cell throughput and the $5^{th}$ percentile user throughput.

It can be seen that the PFT+PFTF scheme shows a little worse performance than the pure PFTF. Especially in the high load case, the PFT+PFTF scheme with bound of 8 shows very close performance to the pure PFTF.

Of course, there are other options for user pre-selection, which might have even better performance than the ones shown. Therefore, user pre-selection provides the potential to further improve the system performance with limited DL signaling.

Figure 2:
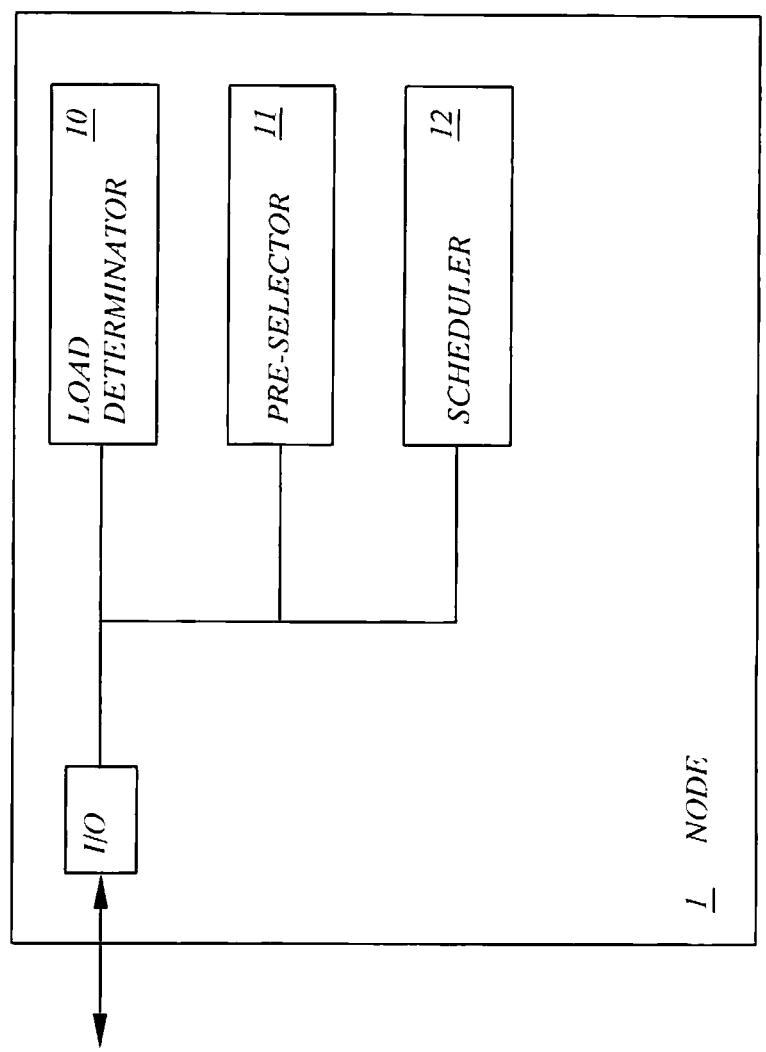
FIG. 2 is a schematic illustration of an embodiment of an arrangement according to the invention.

A node according to an embodiment of the present invention is configured for enabling the above discussed method according to the invention, and will be described with reference to FIG. 2. The node can, according to a specific embodiment, be represented by but not limited to a Node B in a UMTS telecommunication network.

A basic embodiment of a node 1 according to the invention comprises a load determination unit 10 which enables measuring or at least acquiring a measure of the present load in the system, a comparing unit 11 that compares the load measure to a preset load measure threshold, and a pre-selection unit 12 that pre-selects a subset of user terminals for scheduling if the load measure surpasses the threshold value. Finally, the node 1 comprises a scheduling unit 13 for scheduling the pre-selected user terminals.

If the threshold is not surpassed by the present load, the scheduling unit 13 is adapted for scheduling all user terminals in a known manner.

Advantages of the Invention comprise:

The DL signaling overhead, which is related to channel-dependent frequency-domain scheduling is greatly reduced by limiting the number of users for scheduling;

Less signaling overhead is required by frequency-domain resource allocation due to the reduced amount of users;

Less signaling overhead is required by link adaptation due to the reduced amount of users;

The complexity of the corresponding frequency-domain adaptation can be limited within a pre-defined scale;

The scales of signaling overhead and computational complexity can be pre-defined as fixed, regardless of varying system load, for the given bandwidth, which is favored by the further signaling design.

It will be understood by those skilled in the art that various modifications and changes, including combinations of various embodiments, may be made to the present invention without departure from the scope thereof, which is defined by the appended claims.

REFERENCES

[1] R. Knopp and P. Humblet, Information capacity and power control in single-cell multiuser communication, in *Proc. of Int. Conf. on Communication*, June 1995, vol. 1, pp. 331-335.
[2] W. Anchun, X. Liang, Z. Shidong, X. Xibin, and Y. Tan, Dynamic resource management in the fourth generation wireless systems, *Proceedings IEEE International Conference on Communication Technology*, April 2003.
[3] K. Muhammad, Comparison of Scheduling Algorithms for WCDMA HS-DSCH in different Traffic Scenarios, *IEEE PIMRC'2003* Beijing, China 2003.

The invention claimed is:

1. A method of improved channel-dependent time- and frequency-domain scheduling in an Orthogonal Frequency-Division Multiplexing (OFDM) based telecommunication system, said system comprising a plurality of user terminals, the method comprising:
    determining at a node of a telecommunication network a parameter value representative of a system load;
    responsive to determining the parameter value representative of the system load, pre-selecting at the node of the telecommunication network a subset of said plurality of user terminals, the subset being limited at the node of the telecommunication network to a pre-defined scale, when said determined parameter value representative of the system load is larger than a predetermined threshold; and
    responsive to determining the parameter value representative of the system load, performing at the node of the telecommunication network frequency-domain scheduling of said pre-selected subset of user terminals when said determined parameter value representative of the system load is larger than the predetermined threshold to reduce the downlink signaling overhead and to enable improved efficiency of the channel-dependent time- and frequency-domain scheduling.

2. The method according to claim 1, comprising repeating the determining, pre-selecting and frequency-domain scheduling for the remaining user terminals.

3. The method according to claim 1, where said determined parameter value representative of system load comprises a relative signaling overhead for all user terminals of the plurality of user terminals so that pre-selecting a subset of said plurality of user terminals comprises pre-selecting the subset of said plurality of user terminals at the node of the telecommunication network when said relative signaling overhead is larger than a predetermined threshold.

4. The method according to claim 3, where said predetermined threshold comprises a relative signaling overhead of 10%.

5. The method according to claim 1, wherein pre-selecting a subset comprises pre-selecting said subset randomly from said plurality of user terminals at the node of the telecommunication network.

6. The method according to claim 1, wherein pre-selecting a subset comprises pre-selecting said subset based on a maximum Carrier to Interference Ratio (Max-CIR) criterion at the node of the telecommunication network.

7. The method according to claim 6, wherein pre-selecting a subset comprises pre-selecting user terminals with the highest signal to interference noise ratio at the node of the telecommunication network.

8. The method according to claim 7, wherein pre-selecting a subset comprises pre-selecting said user terminals framewise and chunk-wise at the node of the telecommunication network.

9. The method according to claim 1, wherein pre-selecting a subset comprises pre-selecting said subset based on a ratio between an estimated throughput and an average throughput for each user terminal at the node of the telecommunication network.

10. The method according to claim 9, wherein pre-selecting a subset comprises pre-selecting user terminals with the highest ratio at the node of the telecommunication network.

11. The method according to claim 1, wherein pre-selecting a subset comprises pre-selecting said subset based on one or a combination of throughput and/or quality of service.

12. The method according to claim 1, where said subset of user terminals comprises at least two user terminals and not all user terminals.

13. The method according to claim 1 wherein the pre-defined scale is fixed.

14. The method according to claim 1 further comprising:
    responsive to determining the parameter value representative of the system load, performing at the node of the telecommunication network scheduling of all user terminals when said determined parameter value representative of the system load is less than the predetermined threshold.

15. A node in an Orthogonal Frequency-Division Multiplexing (OFDM) communication system, said system comprising a plurality of user terminals, said node comprising:
    a load determinator configured to determine a parameter value representative of a system load;
    a pre-selector configured to pre-select a subset of the plurality of user terminals, the subset being limited at the node to a pre-defined scale, responsive to determining the parameter value representative of the system load when said determined parameter value is larger than a predetermined threshold value; and
    a scheduler configured to perform frequency-domain scheduling of said pre-selected subset of user terminals responsive to determining the parameter value representative of the system load to reduce the downlink signaling overhead and to enable improved efficiency of channel-dependent frequency domain scheduling.

16. The node according to claim 15 wherein the pre-selector and scheduler are configured to repeat operations of pre-selection and scheduling for the remaining user terminals.

17. The node according to claim 15, where said pre-selector is further configured to pre-select said subset of user terminals at the node based on one or a combination of signal to interference noise ratio, randomly, maximum Carrier to Interference Ratio (Max-CIR), quality of service, throughput.

18. The node according to claim 17, where said node is a Node B in a Universal Mobile Telecommunications System (UMTS).

19. The node according to claim 15, where said node is a Node B in a Universal Mobile Telecommunications System (UMTS).

20. The node according to claim 15, where said determined parameter value representative of system load comprises a relative signaling overhead for all user terminals of the plurality of user terminals so that the pre-selector is configured to pre-select a subset of said plurality of user terminals by pre-selecting the subset of said plurality of user terminals if when said relative signaling overhead is larger than a predetermined threshold.

21. The node according to claim 15 wherein the scheduler is further configured to perform scheduling of all user terminals responsive to determining the parameter value representative of the system load when said determined parameter value representative of the system load is less than the predetermined threshold.

22. The node according to claim 15, wherein the pre-selector is configured to pre-select the subset by pre-selecting user terminals with the highest signal to interference noise ratio frame-wise and chunk-wise.

* * * * *

UNITED STATES PATENT AND TRADEMARK OFFICE
CERTIFICATE OF CORRECTION

| | | |
|---|---|---|
| PATENT NO. | : 8,611,286 B2 | Page 1 of 1 |
| APPLICATION NO. | : 12/377010 | |
| DATED | : December 17, 2013 | |
| INVENTOR(S) | : Wan et al. | |

It is certified that error appears in the above-identified patent and that said Letters Patent is hereby corrected as shown below:

On the Title Page, Item (57), under "ABSTRACT", in Column 2, Line 5, delete "SI" and insert -- S1 --, therefor.

In the Specification

In Column 6, Line 41, delete "by but not limited to" and insert -- by, but not limited to, --, therefor.

In the Claims

In Column 9, Line 3, in Claim 20, delete "if when" and insert -- when --, therefor.

Signed and Sealed this
Fifth Day of August, 2014

Michelle K. Lee
*Deputy Director of the United States Patent and Trademark Office*